G. SYKES.
FRUIT ASSORTING AND PACKING TABLE.
APPLICATION FILED MAR. 4, 1912.

1,046,038.

Patented Dec. 3, 1912.
2 SHEETS—SHEET 1.

WITNESSES:
J. L. Moore
L. Abbott

INVENTOR:
George Sykes,
BY
O. P. Martin
ATT'Y.

G. SYKES.
FRUIT ASSORTING AND PACKING TABLE.
APPLICATION FILED MAR. 4, 1912.

1,046,038.

Patented Dec. 3, 1912.
2 SHEETS—SHEET 2.

WITNESSES:

INVENTOR:
George Sykes.
BY
ATT'Y.

UNITED STATES PATENT OFFICE.

GEORGE SYKES, OF PORTLAND, OREGON, ASSIGNOR OF ONE-HALF TO HARDIE MANUFACTURING COMPANY, OF HUDSON, MICHIGAN, A CORPORATION OF MICHIGAN.

FRUIT ASSORTING AND PACKING TABLE.

1,046,038.	Specification of Letters Patent.	Patented Dec. 3, 1912.

Application filed March 4, 1912. Serial No. 681,656.

*To all whom it may concern:*

Be it known that I, GEORGE SYKES, a citizen of the United States, residing at Portland, in the county of Multnomah and State of Oregon, have invented certain new and useful Improvements in Fruit Assorting and Packing Tables, of which the following is a specification.

My invention relates to a device for use in sorting fruit or similar edibles, and for use in packing such fruit for shipment.

The object of my invention is to provide a device of this character, which can be readily carried directly to the tree or vine from which the fruit is picked by the persons performing the sorting operation, and which, on account of its simplicity, compactness and convenience of operation, permits of the sorting and packing of a greater quantity of fruit in a fixed space of time, than has hitherto been possible, without bruising or in any other way depreciating the value of the fruit.

To this end my invention consists of a table, made in the shape of a trapezium and divided into a series of compartments. On this table I mount a receiving or sorting tray, and on the sides of the table I provide means for attaching suitable brackets adapted to support the boxes in which the fruit, after sorting, are packed.

The specific features of my device and the advantages and importance of its construction are fully explained in the following description, and by reading said description in connection with the appended drawings, anyone versed in the art will quickly arrive at a complete understanding of my invention.

Figure 1:
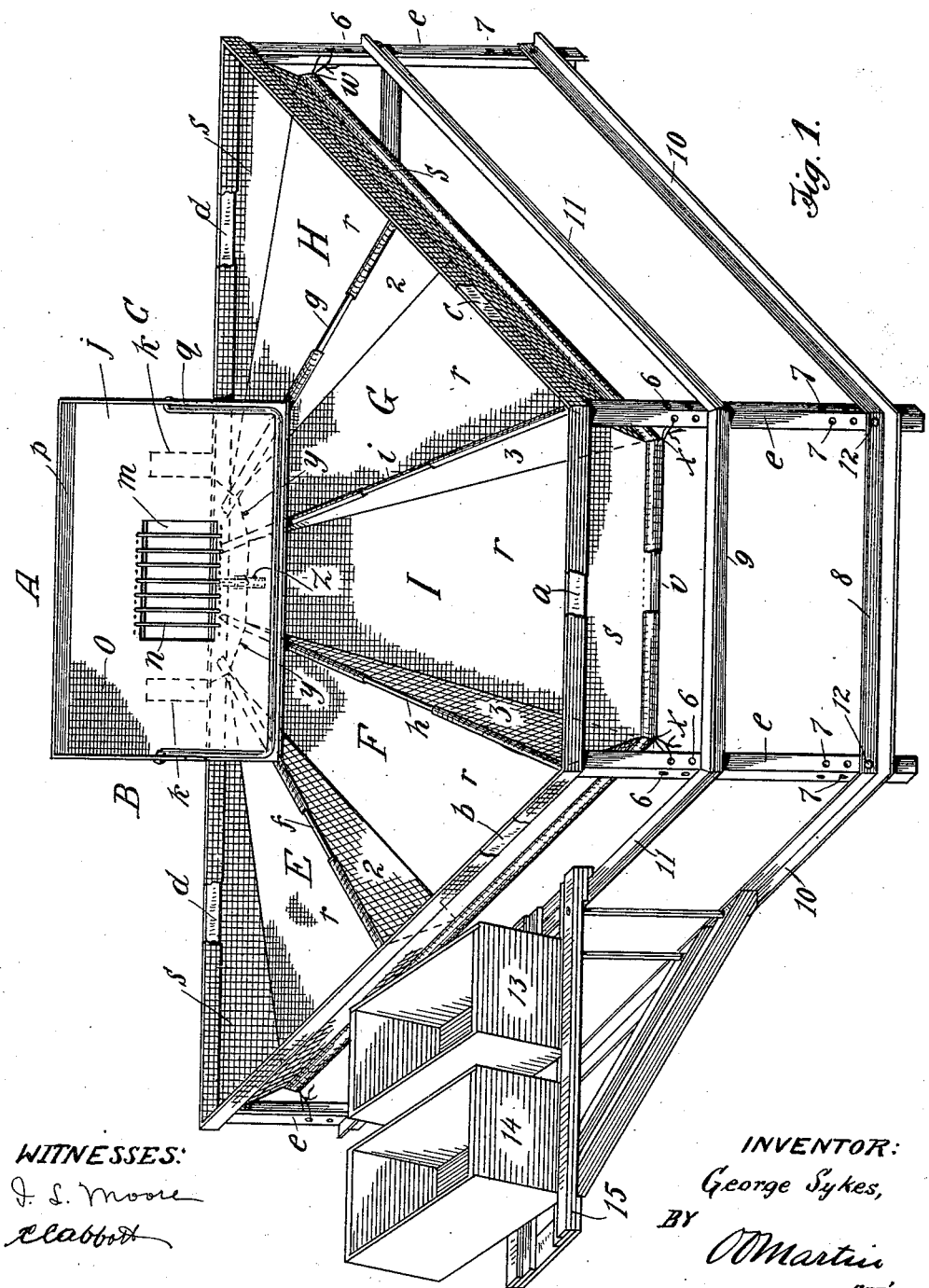
Figure 2:
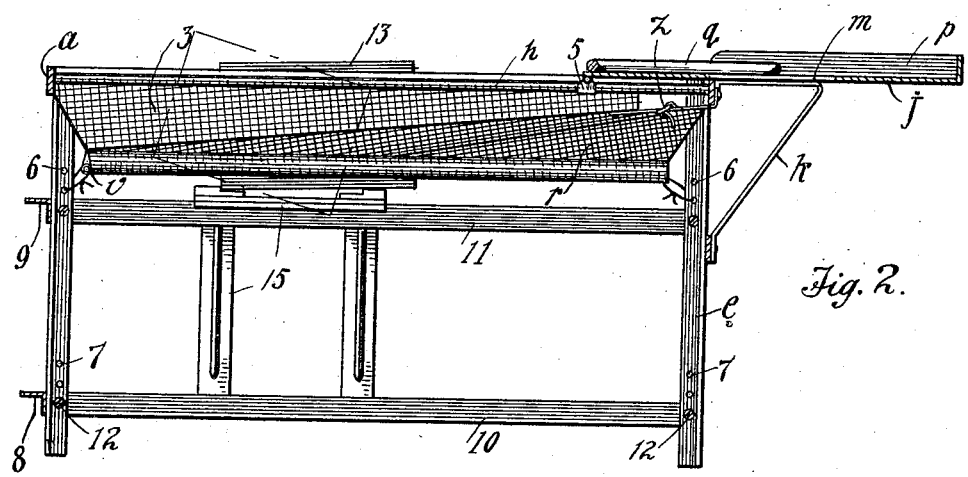
Figure 3:
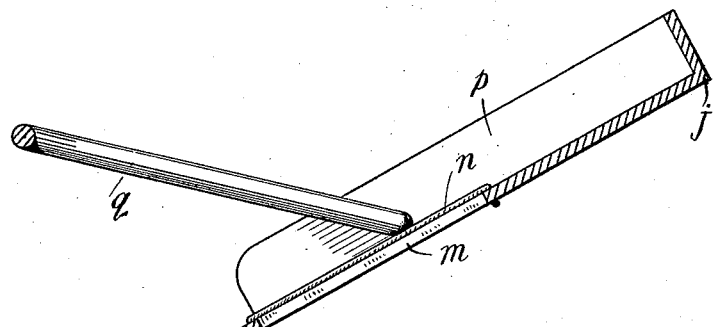
Figure 3:
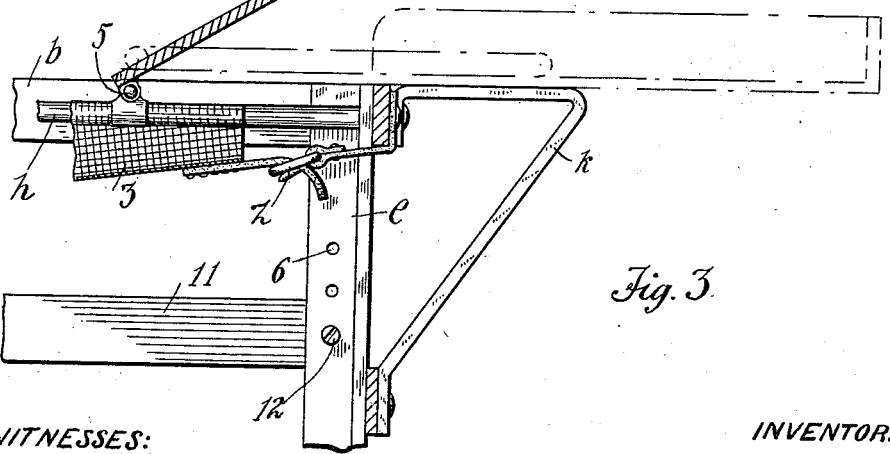

In the drawings: Figure 1 is a perspective front elevation of my sorting table, Fig. 2 is a cross sectional side elevation of the table, taken substantially through the center of the table, and Fig. 3 illustrates, on a larger scale, parts of the mechanism more fully described later.

The table, as stated, is trapeziform in shape, and its sides so proportioned, that the length of the front-rail $a$ is one half the length of the oblique side-rails $b$, $c$ and one third the length of the back-rail $d$. At the corners said rails are rigidly secured to suitable legs $e$, which conveniently may be made from angle-irons as shown in the drawings.

From points near the center of back-rail $d$ extend braces $f$, $g$ to the center of side-rails $b$, $c$, and braces $h$, $i$ to the corners of the front-rail. A tray $j$ is, by the aid of suitable brackets $k$, centrally fixed on the rear portion of the table, and so proportioned relative to the back-rail and the four braces, that the portions $l$, between the intersections of the tray with said rail and braces, are equal in length and one third the length of the front-rail $a$. Said rail $a$ must be approximately three feet long and the proportions specified adhered to in order to make the table convenient for operation, as will hereinafter be made clear.

Tray $j$ is square and made with a central perforation $m$, fitted with a screen $n$, and the wire of said screen is preferably covered with rubber tubing or other soft covering in order to prevent the wires injuring the fruit deposited on the tray. For the same reason the remainder of the tray bottom may be covered with a piece of carpet or other soft lining as indicated by letter $o$. The part of the tray positioned outside the edge of the table is made with a flange $p$, and on this flange I journal a wire loop $q$, which serves as a flange for the part of the tray resting on the table.

The table-top comprises one continuous piece of fabric $r$, provided with a border $s$, extending the entire perimeter of said fabric piece, and said border is made with an upper hem $t$, encompassing the top-rails of the table, and a lower hem $u$, in which a rod or pipe $v$ is seated. The ends $w$ and the front corners $x$ of said rod or pipe are secured to the table legs in any manner which permits of adjustment, so as to take up any slackness in the table cover. For the same purpose the rear center part of the fabric cover is cut away, substantially on line $y$, and suitable means, as straps $z$, are introduced.

The table is divided into five compartments by braces $f$, $g$, $h$, $i$, and by partition strips 2, 3, the lower edges of which are secured to the table cover, while their upper edges are made with a hem encompassing said braces.

The mechanism thus far described constitutes the sorting apparatus, the operation of which is as follows: Around tray $j$ I place three operators, one a waiter, is placed in the rear at A, and it is his duty to place the fruit on said tray. The fruit is delivered to him in buckets by the pickers, and the tray is so proportioned that a bucketful will just cover the tray. He empties the bucket on to screen m and spreads it over the entire surface of the tray. Fruit that is too small to be of commercial value, and all waste matter drop through said screen to the ground, or a suitable receptacle may be placed underneath the screen to receive such matter.

At B and C I place operators, who transfer the fruit from the tray to the different compartments of the table. The operator at B picks up all the large fruit and deposits it according to quality in the first two compartments E, F, while the operator at C places all the small fruit according to quality in compartments G, H. The medium sized fruit, which remains on the tray, is finally placed in central compartment I. The tray may conveniently be hinged on braces f, g, as indicated at 4, 5, and the transfer of the said remaining fruit expedited by raising loop q, tilting the tray slightly and thus permitting the said remaining fruit to roll into compartment I. As readily seen in the drawings, the table cover slopes from the rear center toward the front and sides, wherefore the fruit deposited in the different compartments rolls down the incline to the packers' stations.

The table legs are provided with two sets of perforations 6, 7, which serve as receptacles for clamping bolts 12, by means of which a series of parallel bars 8, 9, 10, 11 are mounted on the table. Packing boxes 13, 14 are placed on suitable brackets 15, and the latter are detachably hung on said bars as clearly shown in the drawings.

A bracket 15 is hung at the end of each compartment, and adjacent to each bracket is positioned an operator, whose duty it is to transfer the fruit from his compartment to the two boxes 13, 14 according to the size and quality of the fruit. The operator can slide the bracket to the right or left of his compartment to suit his own convenience, and he can tilt the boxes more or less, as indicated in the drawings, for the same purpose. By adjusting bars 8, 9, 10, 11 vertically the operator can also place said brackets, carrying the packing boxes, to suit his height.

From the foregoing description it is seen, that I provide an apparatus of great compactness and convenience of operation. Ample room is left for each operator, and yet the table is no larger, but that an operator from his station can reach any part of it. There is no danger of the table tipping over, even though only the boxes on one side of the table are loaded, and yet the table is so light, that the operators easily can carry it from tree to tree. It is designed to accommodate the arm-reach of the average operator, and it is therefore essential that the relative proportions remain substantially as set forth.

I claim:

1. In a sorting apparatus, in combination; a frame; a fabric cover suspended from said frame; means for retaining said cover tightly suspended; a tray mounted on the edge of said frame, so as to partly overhang the frame; and means for adjustably supporting packing boxes along all sides of the frame; said cover divided by fabric partitions radiating from the center of the frame rear-side into compartments having all outside edges of equal length.

2. In a sorting apparatus, in combination; a fabric covered table; a tray horizontally mounted on said table; and means for adjustably supporting packing boxes along all sides of the table; said table divided by fabric partitions radiating from the center of its rear side into five compartments having all outside edges of equal length; said tray placed on the middle third of the rear table side and having a central screen overhanging the said rear side.

3. In a sorting apparatus, in combination; a trapeziform table having a fabric top; a tray horizontally mounted on said table; and means for adjustably supporting packing boxes along all sides of the table; said trapeziform table top divided by fabric partitions radiating from the center of its long side into five compartments having all outside edges of equal length; said tray covering the middle third of the said long side and having a central screen overhanging said long side.

4. In a sorting apparatus, in combination; a trapeziform table having a fabric top; means for keeping the fabric tightly stretched; a tray horizontally mounted on said table; and means for adjustably supporting packing boxes along all sides of the table; said trapeziform table top divided by fabric partitions radiating from the center of its long side into five compartments having all outside edges of equal length, and sloping from the said center downward toward said outer edges; said tray covering the middle third of the said long side and having a central screen overhanging said side.

5. In a sorting device, the combination of a trapeziform table, the length of the front, oblique sides and back built in 1, 2, 3 proportion, the fabric top of said table divided into five compartments by fabric partitions radiating from the center part of the back, and dividing its oblique sides into halves, said top sloping from the rear center toward the sides and front, provided with a bottom frame hemmed into the fabric so as to prevent contact between the fruit and the said frame, and with means for stretching the fabric to prevent sagging; with a square tray horizontally and centrally mounted on the long side of the top, said tray provided with a central perforation overhanging the said long side, with a screen covering said perforation and with a soft lining; and means for adjustably supporting box-carrying brackets on all sides of the table.

6. In a sorting apparatus, in combination; a skeleton table; a fabric cover suspended from the top of said table, said cover divided by fabric partitions radiating from the center portion of one side of the table into a plurality of compartments; means for stretching the fabric to prevent sagging; means for adjustably supporting packing boxes along all sides of said frame; and a tray horizontally placed above the radiating center of said partitions, said tray having a central screen overhanging the edge of the frame, said screen provided to permit all undersize fruit and all foreign matter to drop outside the apparatus.

7. In a sorting apparatus, in combination; a skeleton table, said table comprising a trapeziform top divided by rods into sections, said rods radiating from the central portion of the longest side of the table and dividing the other sides of the table into equal portions; a fabric cover suspended from said trapeziform top; fabric partitions suspended from said rods and fastened on said cover, thereby forming partitions dividing the table into compartments; means for adjustably supporting packing boxes along all sides of the table; and a horizontal tray placed partly above the said central portion of the longest table side, said tray having a centrally located overhanging screen.

In testimony whereof I have hereunto affixed my signature in the presence of two witnesses.

GEORGE SYKES.

Witnesses:
IRENE MOORE,
C. W. HILLS.

---

Copies of this patent may be obtained for five cents each, by addressing the "Commissioner of Patents, Washington, D. C."